(12) United States Patent
Shemtov (10) Patent No.: US 7,914,048 B2
(45) Date of Patent: Mar. 29, 2011

(54) LIQUID-TIGHT COUPLING DEVICE WITH SCREW-ON FERRULE DEVICE AND METHOD OF USE

(76) Inventor: Sami Shemtov, Broward County, FL (US)

( * ) Notice: Subject to any disclaimer, the term of this patent is extended or adjusted under 35 U.S.C. 154(b) by 1021 days.

(21) Appl. No.: 11/366,308

(22) Filed: Mar. 2, 2006

(65) Prior Publication Data

US 2007/0205601 A1  Sep. 6, 2007

(51) Int. Cl.
*F16L 11/118* (2006.01)

(52) U.S. Cl. ............ 285/151.1; 285/91; 285/154.4; 285/249; 285/251; 285/330; 174/653

(58) Field of Classification Search ......... 285/139.1, 285/139.2, 139.3, 143.1, 149.1, 151.1, 154.4, 285/247, 248, 249, 250, 251, 91, 330; 174/652, 174/653
See application file for complete search history.

(56) References Cited

U.S. PATENT DOCUMENTS

| | | | | | |
|---|---|---|---|---|---|
| 3,006,664 | A | * | 10/1961 | Appleton et al. | 285/248 |
| 3,198,555 | A | * | 8/1965 | Johnson et al. | 285/91 |
| 3,492,410 | A | * | 1/1970 | Kelly | 174/78 |
| 3,647,934 | A | * | 3/1972 | Hurtt | 174/652 |
| 4,000,918 | A | * | 1/1977 | Reker | 285/93 |
| 4,674,775 | A | * | 6/1987 | Tajima et al. | 285/330 |
| 4,801,158 | A | * | 1/1989 | Gomi | 285/52 |
| 5,072,072 | A | * | 12/1991 | Bawa et al. | 174/655 |
| 6,102,445 | A | * | 8/2000 | Thomas | 285/139.1 |
| 6,106,027 | A | * | 8/2000 | Mulvey et al. | 285/222.2 |
| 7,213,655 | B2 | * | 5/2007 | Parrott | 166/380 |
| 7,341,281 | B2 | * | 3/2008 | Guesnon et al. | 285/81 |
| 7,469,936 | B2 | * | 12/2008 | Norman | 285/249 |
| 2004/0251687 | A1 | * | 12/2004 | Chelchowski et al. | 285/354 |
| 2005/0104372 | A1 | * | 5/2005 | Auray et al. | 285/139.1 |
| 2005/0264005 | A1 | * | 12/2005 | Norman | 285/249 |

* cited by examiner

*Primary Examiner* — James M Hewitt
(74) *Attorney, Agent, or Firm* — Gloria Tsui-Yip; Howard C. Miskin (57) ABSTRACT

A coupling device that provides a liquid tight seal at the connection with a conduit with easy installation. The device comprises a tubular connector body, a compression nut, a first sealing ring, a second sealing ring, a ferrule, and a lock nut. The coupling device may be installed fully assembled and does not require disassembly of the packaged product before installation. In the connector body a radial ledge is formed within the tubular spaces between the first and second ends. The radial ledge of the connector body has at least one depression. The ferrule has a tubular body with a radial flange extending from a first end portion. At least one protrusion extends from the radial flange that corresponds to the depression on the tubular body. When the depression of the tubular body engages the protrusion of the ferrule, it restricts the ferrule from relative rotation. This restriction allows that the coupling device be installed fully assembled.

12 Claims, 7 Drawing Sheets

LIQUID-TIGHT COUPLING DEVICE WITH SCREW-ON FERRULE DEVICE AND METHOD OF USE

FIELD OF THE INVENTION

The invention relates to a device for coupling a conduit containing electrical cables and/or wires to another conduit or an opening of a junction box with easy installation. In particular, an improved device that provides a liquid-tight fitting around a conduit, including a ferrule that is fixed inside a connector body which restricts relative rotation. This advantageously allows for pre-assembly of the coupling device and quick installation of the coupling device.

BACKGROUND OF THE INVENTION

Figure 1:
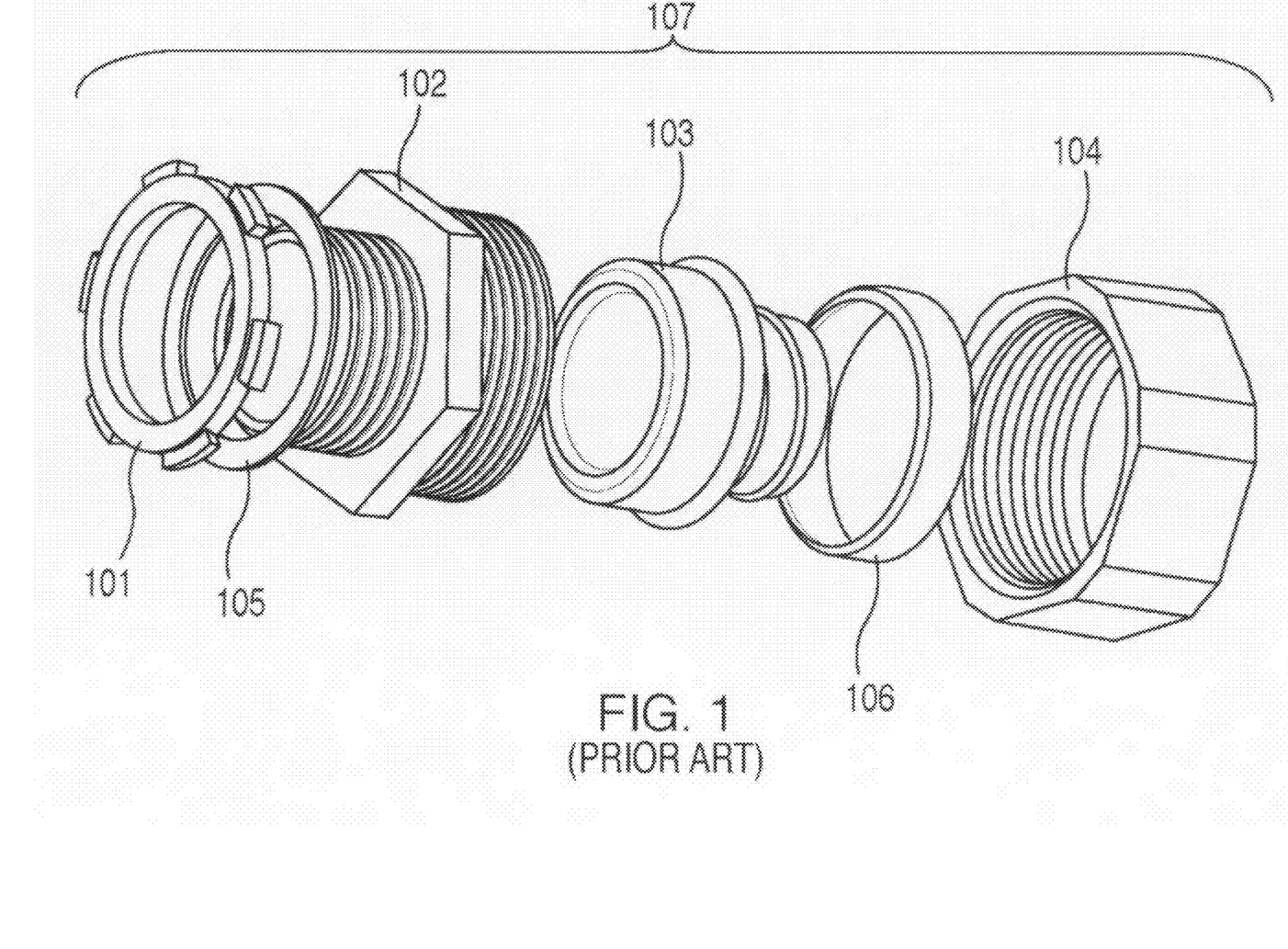
FIG. 1 is an exploded view of a prior art, liquid-tight coupling device.
Figure 2A:
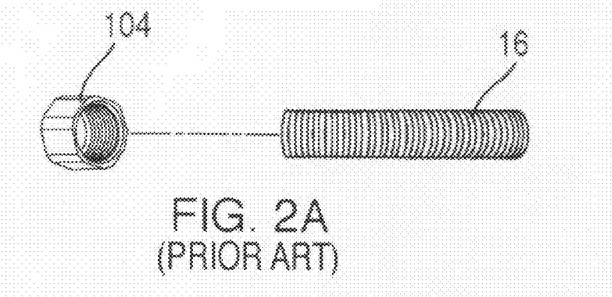
FIG. 2 is a perspective view of the prior art method of installing the prior art liquid-tight coupling device onto a conduit.
Figure 2B:
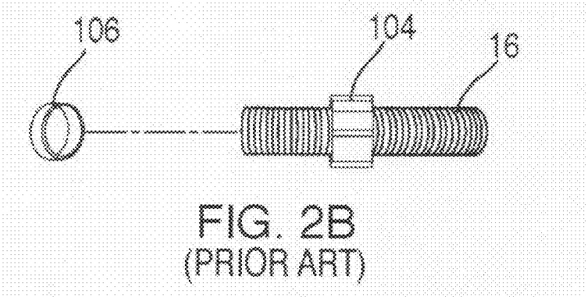
Figure 2C:
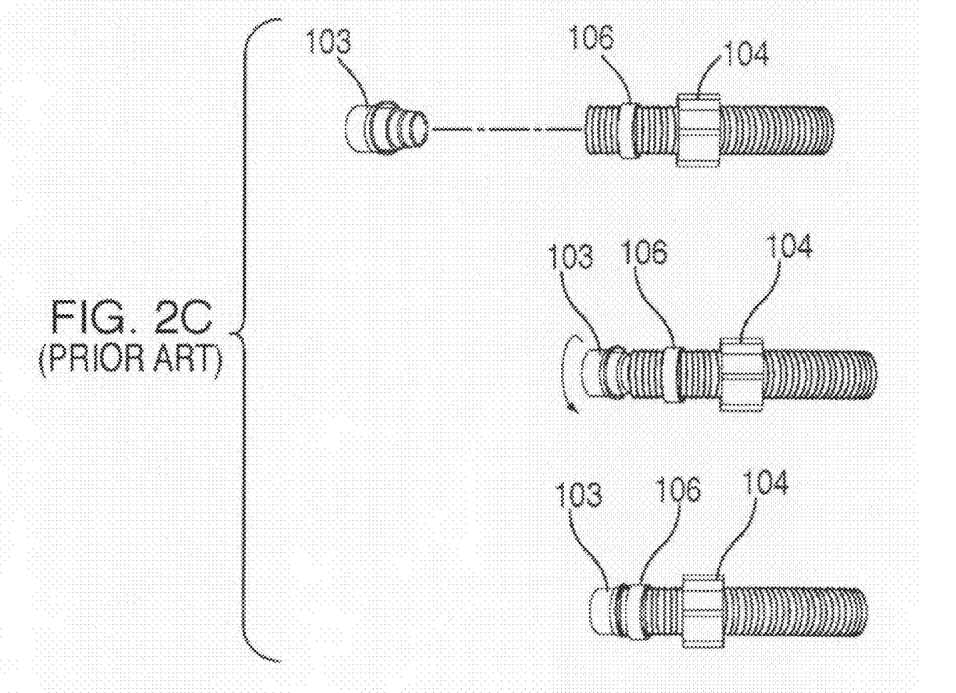
Figure 2D:
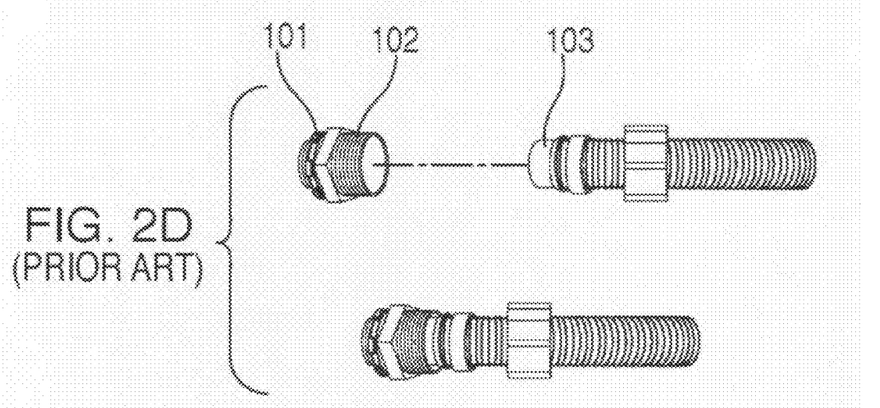
Figure 2E:
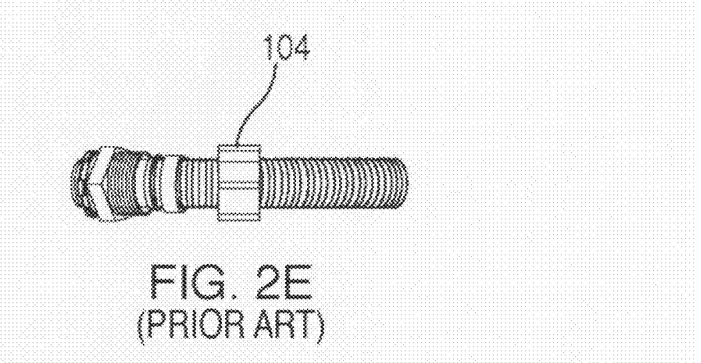
Figure 2F:
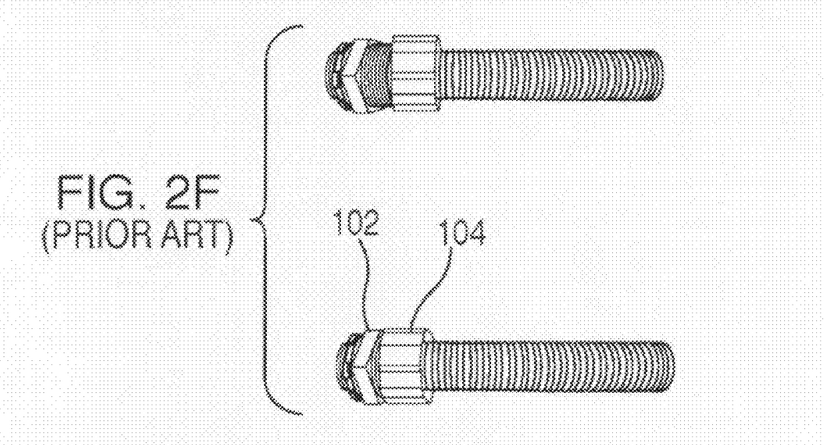

Coupling devices are commonly used to connect two or more conduits containing electrical cables and/or wires. A prime result sought is to prevent or reduce entry of water, moisture or liquid of any type at such connection. As shown in FIG. 1, prior art coupling devices 107 are generally tubular, with threaded opposite ends for receiving the conduit and/or opening. These devices 107 contain many components including a locknut 101, a sealing ring 105, a connector body 102, a ferrule 103, a compression ring 106 and a compression nut 104. Most prior art devices disadvantageously require a multi-step installation process that requires the initial disassembly of the packed coupling device 107 before re-assembly and installation.

As shown in FIG. 2, the standard method of installing a prior art liquid tight connector 107 over a conduit 16 involves at least six steps, labeled A through F. Typically, before the installation process of FIG. 2 begins, the coupling device 107 out of a package must be initially disassembled, as it is packaged fully assembled to avoid loose parts that can be easily lost or misplaced. (Not shown in FIG. 2). Then as shown in Step A, the compression nut 104 is slid over the conduit 16. In Step B, the compression ring 106 is slid over the conduit 16. Next, in Step C, the threaded ferrule 103 is slid into the conduit 16 and turned using a tool or a user's bare hand until the end of the conduit 16 is nested inside the ferrule's 103 radial flare. As shown in Step D, the connector body 102 is slid over the flared end of the ferrule 103. Subsequently, as shown in Step E, the compression nut 104 and ring 106 are slid towards the connector body 102. Lastly, in Step F, the compression nut 104 is tightened against the connector body 102.

Therefore, there is a need for a coupling device that effectively provides a liquid tight seal around a conduit and facilitates quick coupling of conduits without the need for initial disassembly of the coupling device connector before re-assembly and installation.

SUMMARY OF THE INVENTION

The present invention is a coupling device for conduits that provides a liquid tight seal around conduits, is easy to install and does not require pre-disassembly of the coupling device before assembly and installation.

The coupling device of the present invention comprises a tubular connector body, a compression nut, a first sealing ring, a second sealing ring, a ferrule and a locknut. The first end of the connector body has external threading that corresponds to the internal threading of the locknut. The second end of the tubular connector body has external threading that corresponds to the internal threading of the compression nut. The second end of the connector body has a larger diameter than the first end. The internal diameter of the second end is correspondingly larger than the internal diameter of the first end, such that a radial ledge is formed within the tubular spaces between the first and second ends. The ferrule has a tubular body with a radial flange extending from a first end portion. Extending from the radial flange is a tubular wall spaced apart from the tubular body. The diameter of the tubular wall is slightly larger than the diameter of the first end portion. The free end of the tubular wall flares radially away from the tubular body, creating a radial flare. At least one protrusion extends from, or alternatively, at least one aperture is on, the radial flange of the ferrule. The radial ledge of the connector body has at least one depression or alternatively, at least one protrusion that corresponds to the protrusion or aperture, respectively, on the ferrule.

The coupling device of the present invention is assembled with the protrusions of the radial flange on the ferrule engaging the depression of the radial ledge of the connector body, the second sealing ring radially engaging the first end of the connector body, the locknut radially engaging and threaded first end of the connector body, the first sealing ring rests against the radial flare of the ferrule, the internal threading of the compression nut radially engages the external threading of the second end of the connector body. The mating of the tubular connector body and the ferrule restricts relative rotation of the ferrule during installation. The tubular body of the ferrule has external threading or spirals that corresponds to the internal threading or spirals of a conduit.

The connector body, ferrule, first sealing ring, second sealing ring and compression nut may be made from rust-proof metal. In one embodiment of the present invention the first sealing ring is made of plastic.

The present invention is also the method of installing the liquid tight coupling device discussed above. The liquid tight coupling device may be installed fully assembled and does not require disassembly of the packaged product before installation as in the prior art method.

BRIEF DESCRIPTION OF THE DRAWINGS

A preferred embodiment of the present invention has been chosen for purposes of illustration and description and is shown in the accompanying drawings forming a part of the specification wherein.

DETAILED DESCRIPTION OF THE PREFERRED EMBODIMENTS

Figures 3, 3A:
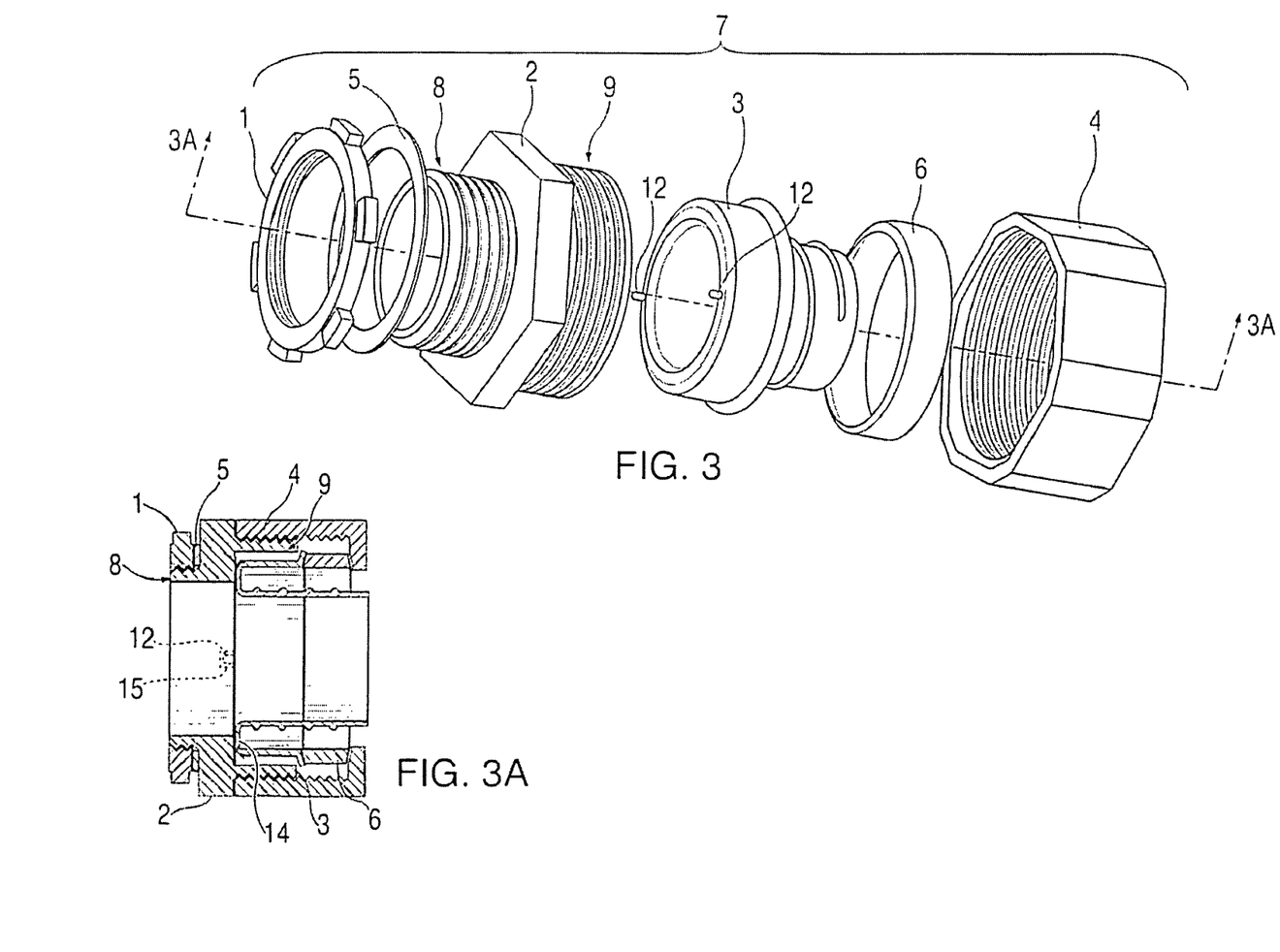
FIG. 3 is an exploded view of the liquid tight coupling device of the present invention.
FIG. 3A is side elevation view in vertical section of the assembled liquid tight coupling device of the present invention shown in FIG. 3.

With reference to the drawings, wherein the same reference number indicates the same element throughout, there is shown in FIG. 3 an exploded view of a liquid tight coupling device 7 of the present invention. As shown in FIG. 3, the coupling device 7 includes a locknut 1, a tubular connector body 2, a ferrule 3, a compression nut 4, a first sealing ring 6, and a second sealing ring 5.

Figure 4:
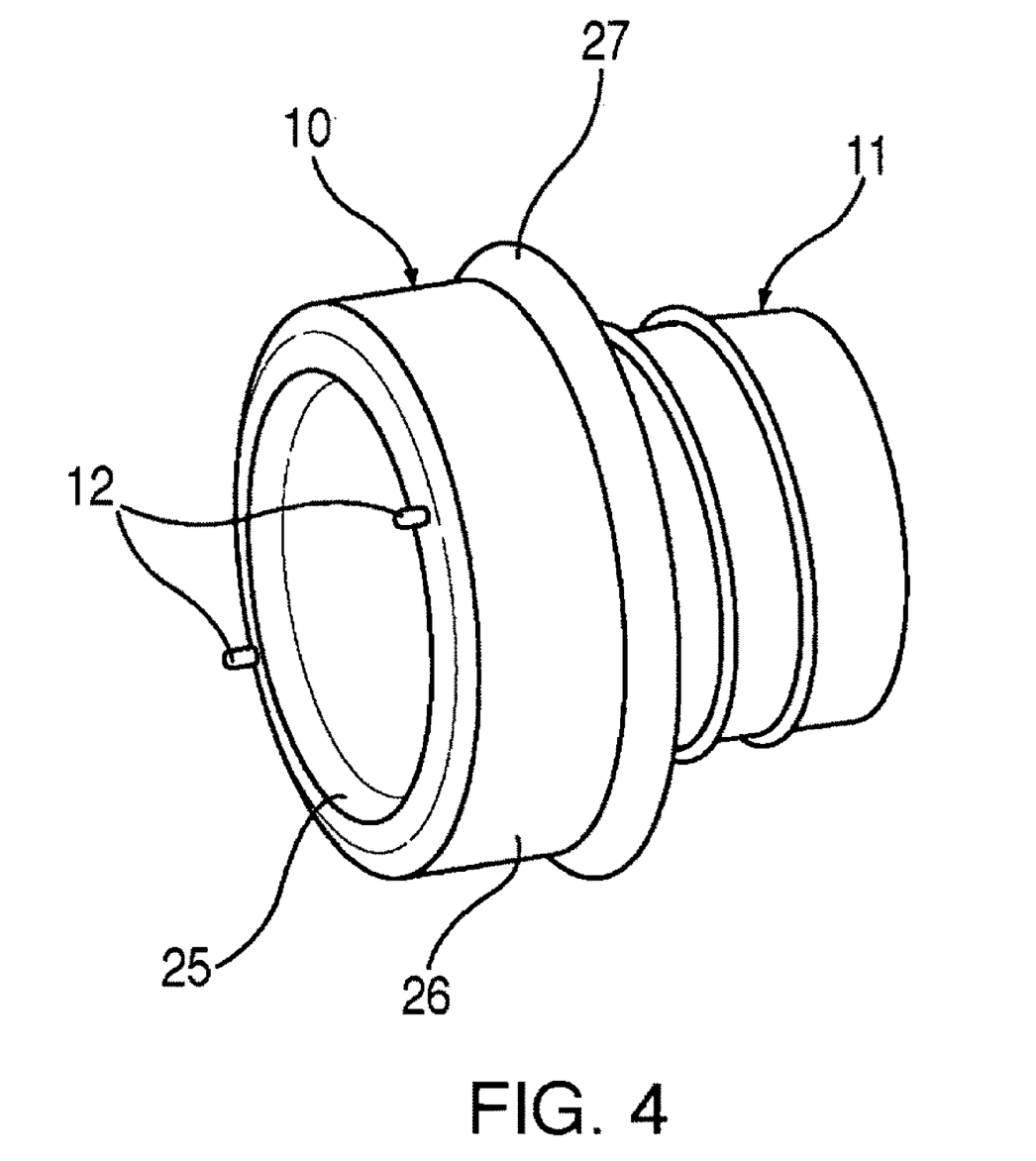
FIG. 4 is a perspective view of the ferrule of the present invention.
Figure 5:
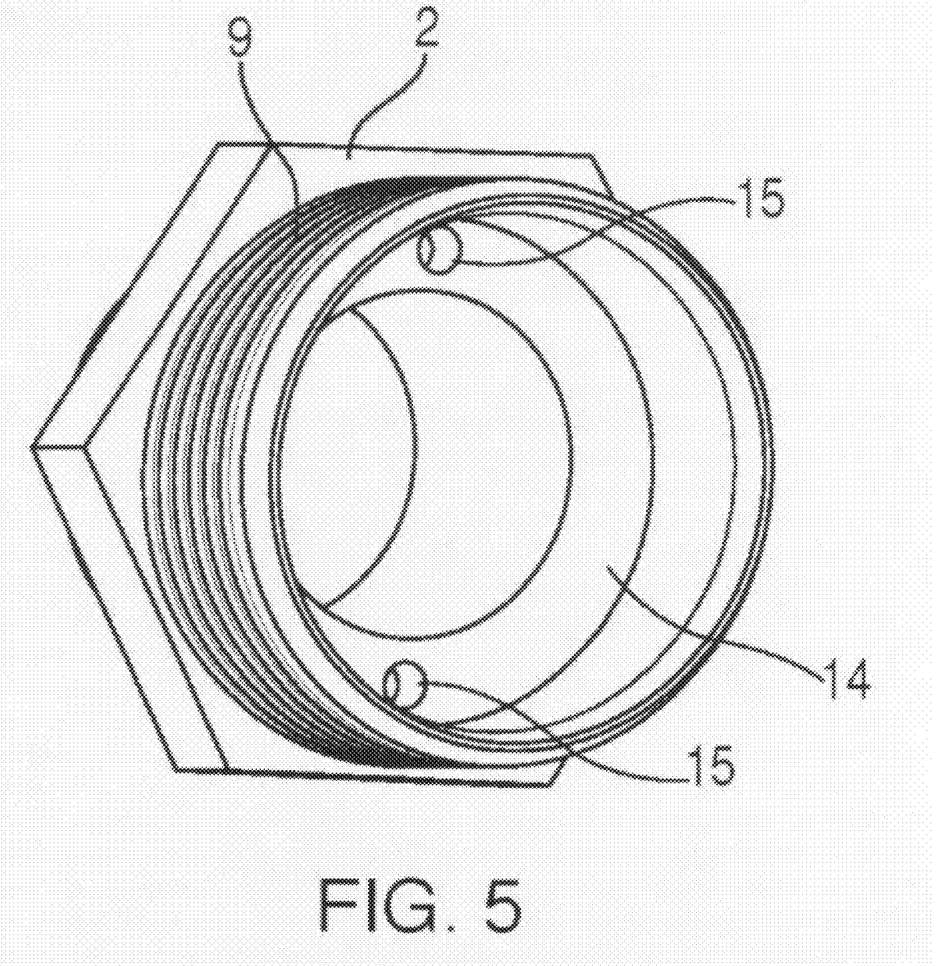
FIG. 5 is a perspective view of the tubular connector body of the present invention.

As shown in FIGS. 3-6, tubular connector body 2 has a first end 8 that is externally threaded to correspond to the internal threading of the locknut 1. The tubular connector body 2 has a second end 9 that is externally threaded to correspond to the internal threading of compression nut 4. The second end of the connector body 9 has a larger diameter than the first end 8. As shown in FIG. 5, the internal diameter of the second end 9 is correspondingly larger than the internal diameter of the first end 8, such that a radial ledge 14 is formed within the tubular spaces between the first and second ends 8 and 9. Locknut 1 is internally threaded to cooperatively mate with the first end 8 of the tubular connector body 2.

As shown in FIG. 4, ferrule 3 has a tubular body with a radial flange 25 extending from a first end portion 10. Extending from the radial flange 25 is a tubular wall 26 spaced apart from the tubular body. The diameter of the tubular wall 26 is slightly larger than the diameter of the first end portion 10 defining a circular well for engaging the conduit 16. The free end of the tubular wall flares radially away from the tubular body, creating a radial flare 27. A second end 11 of the ferrule 3 is externally threaded or spiraled to correspond to the threads or spirals of a conduit 16 to cooperatively engage the conduit 16. At least one axially-extending, cylindrical protrusion 12 (See FIGS. 3, 3A and 4 at element 12) extends from, or alternatively at least one aperture (not shown) is on the radial flange 25. As shown in FIG. 5, the radial ledge 14 of tubular connector body 2 has at least one axially-extending, cylindrical depression 15 (See FIGS. 3A and 5 at element 15) or alternatively protrusion (not shown), that corresponds to the protrusion 12 or aperture (not shown), respectively, on the ferrule 3. When the protrusion of tubular connector body 2 and the corresponding depression on ferrule 3 are engaged, the tubular connector body 2 restricts the ferrule 3 from relative rotation.

Compression nut 4 is internally threaded to correspondingly engage the external threading of the second end 9 of the tubular connector body 2.

The diameter of the second sealing ring 5 is correspondingly sized so as to axially engage the first end 8 of the tubular connector body 2.

The first sealing ring 6 shown has a U-shaped cross section and is sized so as to be nested against the radial flare 27 of the ferrule 3 and around the conduit 16.

The coupling device 7 is packaged, shipped and installed fully assembled. To pre-assemble the coupling device 7, the second sealing ring 5 is axially placed around the first end 8 of the tubular connector body 2. Next, the threaded locknut 1 engages the external threading on the first end 8 of the tubular connector body 2. The second end portion of the ferrule 3 is axially placed into the tubular space of the second end 9 of the tubular connector body 2. The protrusions 12 of the ferrule 3 engage the corresponding depressions 15 of the tubular connector body 2. Next, the first sealing ring 6 is concentrically nested within compression nut 4. The threads of compression nut 4 engage the external threading on the second end 9 of the tubular connector body 2.

Figure 6A:
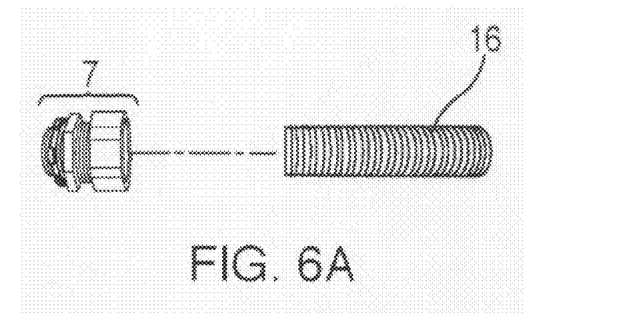
FIG. 6 is a perspective view of the method of installing the coupling device of the present invention over a conduit.
Figure 6B:
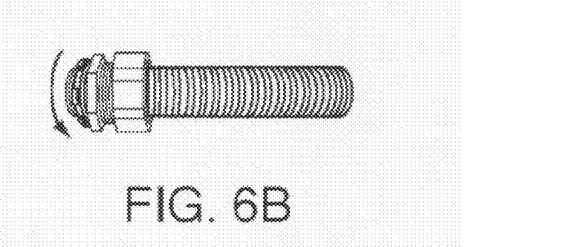
Figure 6C:
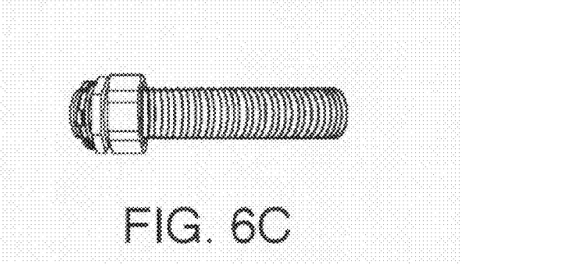

The method of installing the liquid tight coupling device 7 onto a conduit 16 is shown in FIG. 6. As shown in FIG. 6 Step A, the liquid tight coupling device 7 is installed fully assembled. First, in Step A the conduit 16 is axially placed into the fully assembled coupling device 7 to engage the circular well of the ferrule 3. Next, in Step B, the liquid tight coupling device 7 is turned until the threads or spirals on the second end portion of the ferrule 3 engage the spirals or threads of the conduit 16. The protrusions 12 on the radial flange 25 of the ferrule 3 engage the corresponding depressions/apertures 15 of the radial ledge 14 of the tubular connector body 2, thereby restricting relative rotation of the ferrule 3 to allow the installation of the coupling device 7 fully assembled. In the last step, Step C, compression nut 4 is threadedly tightened onto the second end 9 of the tubular connector body 2 such that the first sealing ring 6 rest against the radial flare 27 of the ferrule 3 and the conduit 16 in a liquid sealing relationship to provide a liquid tight seal at the connector 7.

In an alternative embodiment, the protrusions 12 on the radial flange 25 of the ferrule 3 may be depression(s), while the depressions 15 on the radial ledge 14 of the connector body 2 may be corresponding protrusions. Other corresponding mating elements can be used to restrict relative rotation of the ferrule 3 with respect to the tubular body 2.

Figure 7:
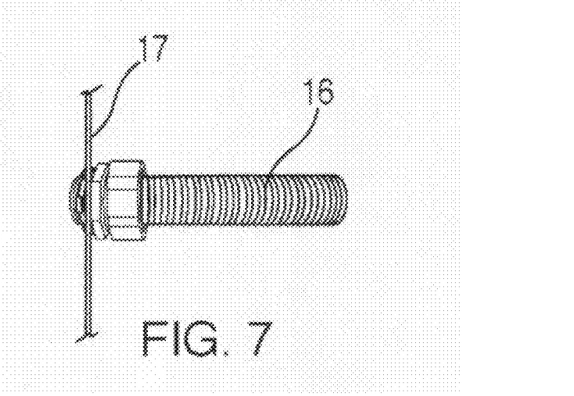
FIG. 7 shows the coupling device connecting a conduit to an opening in a junction box.

FIG. 7 shows the coupling device 7 connecting a conduit 16 to an opening of a junction box 17.

The features of the invention illustrated and described herein are the preferred embodiments. Therefore, it is understood that the appended claims are intended to cover unforeseeable embodiments with insubstantial differences that are within the spirit of the claims

What I claim is:

1. A pre-assembled, liquid tight, electrical conduit coupling device for connecting a first electrical conduit to a second electrical conduit or to an opening of an electrical device with easy installation, said pre-assembled, liquid tight, electrical conduit coupling device comprising:
   a ferrule having a first end portion and a second end portion, a radial flange extending from said first end portion, said second end portion having external threading adapted to cooperatively mate with said first electrical conduit, said radial flange having at least one axially-extending protrusion;
   a tubular connector body defining a tubular space having a first end of a reduced diameter and a second end of an enlarged diameter, said reduced end having external threading adapted to connect to a second electrical conduit or to an opening of an electrical device, said enlarged end having external threading, an internal radial ledge within the tubular space between said first end and said second end, and at least one axially-extending depression that correspondingly engages said at least one axially-extending protrusion of said radial flange of said ferrule for cooperatively engaging said at least one protrusion of said radial flange to restrict relative rotation between said ferrule and said connector body;
   a first sealing ring; and
   a compression nut having internal threading that correspondingly engages said external threading of said enlarged end of said tubular connector body, such that said first sealing ring is concentrically nested within said compression nut to provide a liquid tight seal against said first electrical conduit in response to engagement of said external threading of said enlarged end of said tubular connector body to said internal threading of said compression nut to compress said first sealing ring against said second end portion of said ferrule and said first electrical conduit.

2. The device of claim 1 wherein said at least one depression is located at said internal radial ledge of said connector body.

3. The device of claim 1 wherein said tubular connector body further comprises a body with an enlarged bulge portion.

4. The device of claim 1 further comprising a locknut having a tubular body with circumferential inner and outer edges, first and second ends, and at least one tab extending radially from said outer edge with the distal end of each tab curving towards said second end of said tubular body, said inner edge having internal threading that cooperatively mates with said external threading of said reduced end of said tubular connector body.

5. The device of claim 1 further comprising a second sealing ring on said reduced end of said tubular connector body.

6. The device of claim 1 wherein said at least one protrusion and said at least one depression comprise a cylindrical configuration.

7. A pre-assembled, liquid tight, electrical conduit coupling device for connecting a first electrical conduit to a second electrical conduit or to an opening of an electrical device with easy installation, said pre-assembled, liquid tight, electrical conduit coupling device comprising:
  a ferrule having a first end portion and a second end portion, a radial flange extending from said first end portion, said second end portion having external threading adapted to cooperatively mate with said first electrical conduit, said radial flange having at least one axially-extending depression;
  a tubular connector body defining a tubular space having a first end of a reduced diameter and a second end of an enlarged diameter, said reduced end having external threading adapted to connect to a second electrical conduit or to an opening of an electrical device, said enlarged end having external threading, an internal radial ledge within the tubular space between said first end and said second end, and at least one axially-extending protrusion that correspondingly engages said at least one axially-extending depression of said radial flange of said ferrule for cooperatively engaging said at least one depression of said radial flange to restrict relative rotation between said ferrule and said connector body;
  a first sealing ring; and
  a compression nut having internal threading that correspondingly engages said external threading of said enlarged end of said tubular connector body, such that said first sealing ring is concentrically nested within said compression nut to provide a liquid tight seal against said first electrical conduit in response to engagement of said external threading of said enlarged end of said tubular connector body to said internal threading of said compression nut to compress said first sealing ring against said second end portion of said ferrule and said first electrical conduit.

8. The device of claim 7 wherein said at least at least one protrusion is located at said internal radial ledge of said connector body.

9. The device of claim 7 wherein said tubular connector body further comprises a body with an enlarged bulge portion.

10. The device of claim 7 further comprising a locknut having a tubular body with circumferential inner and outer edges, first and second ends, and at least one tab extending radially from said outer edge with the distal end of each tab curving towards said second end of said tubular body, said inner edge having internal threading that cooperatively mates with said external threading of said reduced end of said tubular connector body.

11. The device of claim 7 further comprising a second sealing ring on said reduced end of said tubular connector body.

12. The device of claim 7 wherein said at least one protrusion and said at least one depression comprise a cylindrical configuration.

* * * * *